US009469541B2

(12) United States Patent
Wei et al.

(10) Patent No.: US 9,469,541 B2
(45) Date of Patent: Oct. 18, 2016

(54) METHOD FOR FORMING CARBON NANOTUBE ARRAY AND METHOD FOR FORMING CARBON NANOTUBE STRUCTURE

(71) Applicants: Tsinghua University, Beijing (CN); HON HAI PRECISION INDUSTRY CO., LTD., New Taipei (TW)

(72) Inventors: Yang Wei, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 93 days.

(21) Appl. No.: 14/609,604

(22) Filed: Jan. 30, 2015

(65) Prior Publication Data
US 2016/0159651 A1    Jun. 9, 2016

(30) Foreign Application Priority Data
Dec. 5, 2014   (CN) .......................... 2014 1 0761006

(51) Int. Cl.
| | | |
|---|---|---|
| B29C 65/54 | (2006.01) | |
| B32B 37/12 | (2006.01) | |
| B32B 38/10 | (2006.01) | |
| B32B 43/00 | (2006.01) | |
| C08J 5/12 | (2006.01) | |
| C01B 31/02 | (2006.01) | |
| B32B 37/00 | (2006.01) | |

(52) U.S. Cl.
CPC ......... *C01B 31/0253* (2013.01); *B32B 37/025* (2013.01)

(58) Field of Classification Search
USPC ................ 156/249, 307.1, 307.3, 307.5
See application file for complete search history.

(56) References Cited

U.S. PATENT DOCUMENTS

| | | | | |
|---|---|---|---|---|
| 7,559,253 B2* | 7/2009 | Liu | .................. | G01N 19/04 73/827 |
| 7,955,644 B2* | 6/2011 | Sansom | .................. | B29C 70/64 427/214 |
| 7,988,893 B2 | 8/2011 | Liao et al. | | |
| 7,992,616 B2* | 8/2011 | Liu | .................. | B82Y 30/00 156/229 |
| 8,048,256 B2 | 11/2011 | Feng et al. | | |
| 8,068,626 B2 | 11/2011 | Jiang et al. | | |
| 8,101,953 B2 | 1/2012 | Jiang et al. | | |
| 8,247,036 B2 | 8/2012 | Jiang et al. | | |
| 8,247,055 B2* | 8/2012 | Jiang | .................. | B32B 7/06 428/167 |
| 8,248,377 B2 | 8/2012 | Jiang et al. | | |
| 8,269,932 B2 | 9/2012 | Fu et al. | | |
| 8,329,134 B2* | 12/2012 | Liu | .................. | B82Y 30/00 423/447.1 |
| 8,343,297 B2* | 1/2013 | Liu | .................. | B82Y 30/00 156/160 |
| 8,366,853 B2* | 2/2013 | Liu | .................. | B82Y 30/00 156/161 |
| 8,367,035 B2* | 2/2013 | Rogers | .................. | B82Y 10/00 423/447.3 |
| 8,414,859 B2* | 4/2013 | Feng | .................. | B82Y 30/00 423/447.1 |
| 8,431,053 B2* | 4/2013 | Liu | .................. | B82Y 30/00 264/146 |

(Continued)

*Primary Examiner* — Sing P Chan
(74) *Attorney, Agent, or Firm* — Zhigang Ma

(57) ABSTRACT

A method for forming a carbon nanotube array is disclosed. More than one carbon nanotube array is transferred onto an accepting surface of one substitute substrate by sandwiching a liquid medium between the substitute substrate and the plurality of carbon nanotube arrays and solidifying the liquid medium into a solid medium. The solid medium is melt to form the liquid medium again. The carbon nanotube arrays are slid on the accepting surface of the substitute substrate to contact side surfaces with each other to form the carbon nanotube assembling array. A method for forming a carbon nanotube structure, such as a film, is also disclosed.

15 Claims, 11 Drawing Sheets

(56) References Cited

U.S. PATENT DOCUMENTS

| | | | | |
|---|---|---|---|---|
| 8,431,066 B2* | 4/2013 | Liu | B82Y 30/00 | 264/164 |
| 8,435,374 B2* | 5/2013 | Feng | B82Y 30/00 | 156/229 |
| 8,470,221 B2* | 6/2013 | Wei | B82Y 40/00 | 264/165 |
| 8,470,408 B2* | 6/2013 | Branton | G01N 33/48721 | 427/532 |
| 8,545,792 B2* | 10/2013 | Liu | B82Y 30/00 | 423/447.3 |
| 8,563,840 B2* | 10/2013 | Wei | B82Y 40/00 | 216/13 |
| 8,580,132 B2* | 11/2013 | Lin | C01B 31/0438 | 216/58 |
| 8,597,526 B2* | 12/2013 | Jiang | B82Y 30/00 | 216/13 |
| 8,623,258 B2* | 1/2014 | Liu | B82Y 30/00 | 264/164 |
| 8,668,896 B2* | 3/2014 | Liu | B82B 3/00 | 423/447.1 |
| 8,794,289 B2* | 8/2014 | Liu | B82Y 30/00 | 156/229 |
| 8,846,143 B2* | 9/2014 | Sansom | B29C 70/64 | 427/214 |
| 8,889,217 B2* | 11/2014 | Chen | H01B 1/04 | 252/502 |
| 8,906,191 B2* | 12/2014 | Jiang | B32B 7/06 | 156/289 |
| 8,906,338 B2* | 12/2014 | Feng | B82Y 30/00 | 423/447.1 |
| 8,920,661 B2* | 12/2014 | Jiang | H01M 4/0428 | 216/13 |
| 8,974,867 B2* | 3/2015 | Lin | C23C 14/48 | 427/523 |
| 9,023,251 B2* | 5/2015 | Cai | H01B 1/24 | 252/500 |
| 9,048,006 B2* | 6/2015 | Feng | B82Y 30/00 | |
| 9,064,614 B2* | 6/2015 | Chen | H01B 1/04 | |
| 9,102,537 B2* | 8/2015 | Li | B01J 21/185 | |
| 9,216,908 B2* | 12/2015 | Lin | C01B 31/0438 | |
| 2008/0014443 A1* | 1/2008 | Zakhidov | B81C 1/00111 | 428/408 |
| 2008/0145616 A1* | 6/2008 | Gharib | B29C 70/64 | 428/156 |
| 2008/0173098 A1* | 7/2008 | Liu | G01N 19/04 | 73/827 |
| 2009/0136682 A1* | 5/2009 | Branton | G01N 33/48721 | 427/532 |
| 2009/0267000 A1* | 10/2009 | Chen | H01B 1/04 | 250/492.1 |
| 2010/0123267 A1 | 5/2010 | Jiang et al. | | |
| 2010/0170891 A1 | 7/2010 | Feng et al. | | |
| 2010/0270704 A1* | 10/2010 | Feng | B82Y 30/00 | 264/291 |
| 2010/0282403 A1* | 11/2010 | Liu | B82Y 30/00 | 156/229 |
| 2010/0310809 A1* | 12/2010 | Jiang | B32B 7/06 | 428/41.8 |
| 2011/0020210 A1* | 1/2011 | Liu | B82B 3/00 | 423/447.1 |
| 2011/0039075 A1* | 2/2011 | Feng | B82Y 30/00 | 428/167 |
| 2011/0120633 A1* | 5/2011 | Liu | B82Y 30/00 | 156/229 |
| 2011/0139361 A1* | 6/2011 | Liu | B82Y 30/00 | 156/249 |
| 2011/0140309 A1* | 6/2011 | Liu | B82Y 30/00 | 264/400 |
| 2011/0142744 A1* | 6/2011 | Feng | B82Y 30/00 | 423/447.1 |
| 2011/0155312 A1* | 6/2011 | Feng | B82Y 30/00 | 156/248 |
| 2011/0159190 A1* | 6/2011 | Liu | B82Y 30/00 | 427/294 |
| 2011/0171419 A1 | 7/2011 | Li et al. | | |
| 2011/0233816 A1* | 9/2011 | Liu | B82Y 30/00 | 264/164 |
| 2011/0241244 A1* | 10/2011 | Liu | B82Y 30/00 | 264/165 |
| 2011/0278758 A1* | 11/2011 | Liu | B82Y 30/00 | 264/145 |
| 2011/0318258 A1* | 12/2011 | Liu | B82Y 30/00 | 423/460 |
| 2012/0021164 A1* | 1/2012 | Sansom | B29C 70/64 | 428/95 |
| 2012/0025427 A1* | 2/2012 | Chen | H01B 1/04 | 264/400 |
| 2012/0043004 A1* | 2/2012 | Wei | B82Y 40/00 | 156/53 |
| 2012/0043690 A1* | 2/2012 | Wei | B82Y 40/00 | 264/171.13 |
| 2012/0045644 A1* | 2/2012 | Wei | B82B 1/002 | 428/368 |
| 2012/0231259 A1* | 9/2012 | Weisenberger | B01J 2/24 | 428/323 |
| 2012/0267582 A1* | 10/2012 | Cai | H01B 1/24 | 252/510 |
| 2012/0273118 A1* | 11/2012 | Jiang | B32B 7/06 | 156/185 |
| 2012/0298618 A1* | 11/2012 | Jiang | H01M 4/0428 | 216/20 |
| 2012/0298619 A1* | 11/2012 | Jiang | B82Y 30/00 | 216/20 |
| 2012/0321785 A1* | 12/2012 | Rogers | B82Y 10/00 | 427/249.1 |
| 2013/0115439 A1* | 5/2013 | Wang | C01B 31/0253 | 428/292.1 |
| 2013/0264011 A1* | 10/2013 | Lin | C01B 31/0438 | 156/247 |
| 2013/0264192 A1* | 10/2013 | Lin | B32B 9/007 | 204/192.34 |
| 2013/0264193 A1* | 10/2013 | Lin | C01B 31/0438 | 204/192.34 |
| 2013/0264307 A1* | 10/2013 | Lin | C01B 31/0438 | 216/49 |
| 2013/0264748 A1* | 10/2013 | Lin | C01B 31/0438 | 264/485 |
| 2013/0266729 A1* | 10/2013 | Lin | C01B 31/0446 | 427/265 |
| 2013/0266738 A1* | 10/2013 | Lin | C23C 14/48 | 427/528 |
| 2015/0065342 A1* | 3/2015 | Li | B01J 21/185 | 502/401 |
| 2015/0174806 A1* | 6/2015 | Wong | D04H 1/728 | 442/335 |
| 2015/0177126 A1* | 6/2015 | Tamayo De Miguel | B82B 3/0085 | 73/643 |
| 2015/0266737 A1* | 9/2015 | Wei | C01B 31/0226 | 264/164 |
| 2015/0274518 A1* | 10/2015 | Wei | B82Y 40/00 | 156/80 |
| 2015/0274519 A1* | 10/2015 | Wei | C01B 31/0253 | 156/80 |
| 2015/0274520 A1* | 10/2015 | Wei | C01B 31/0253 | 156/230 |
| 2015/0291418 A1* | 10/2015 | Wei | B82Y 40/00 | 264/400 |
| 2015/0291419 A1* | 10/2015 | Wei | C01B 31/0253 | 264/28 |
| 2015/0291426 A1* | 10/2015 | Wei | C01B 31/0253 | 264/400 |
| 2015/0291427 A1* | 10/2015 | Wei | C01B 31/0253 | 423/447.1 |
| 2015/0291428 A1* | 10/2015 | Wei | C01B 31/0253 | 156/249 |
| 2015/0360454 A1* | 12/2015 | Wei | B32B 37/025 | 156/230 |
| 2015/0360948 A1* | 12/2015 | Wei | C01B 31/0253 | 264/164 |
| 2015/0360949 A1* | 12/2015 | Wei | C01B 31/0253 | 264/28 |

(56) References Cited

U.S. PATENT DOCUMENTS

| | | | | |
|---|---|---|---|---|
| 2015/0360950 A1* | 12/2015 | Jiang | ................... | C01B 31/0253 428/206 |
| 2015/0360951 A1* | 12/2015 | Jiang | ................... | C01B 31/0253 428/206 |
| 2015/0367557 A1* | 12/2015 | Wei | ....................... | B29C 59/005 428/195.1 |
| 2015/0368105 A1* | 12/2015 | Wei | ........................... | B32B 9/04 156/80 |
| 2016/0021467 A1* | 1/2016 | Wei | ...................... | H04R 31/006 381/164 |

* cited by examiner

METHOD FOR FORMING CARBON NANOTUBE ARRAY AND METHOD FOR FORMING CARBON NANOTUBE STRUCTURE

CROSS-REFERENCE TO RELATED APPLICATIONS

This application claims all benefits accruing under 35 U.S.C. §119 from China Patent Application No. 201410761006.0, filed on Dec. 5, 2014 in the China Intellectual Property Office, the contents of which are hereby incorporated by reference.

FIELD

The subject matter herein generally relates to methods for forming carbon nanotube arrays and structures, and especially relates to methods for forming carbon nanotube arrays and films drawn from the carbon nanotube arrays.

BACKGROUND

Carbon nanotube film can be fabricated by drawing from a carbon nanotube array grown on a growing substrate (e.g., silicon wafer), as disclosed by U.S. Pat. No. 8,048,256 to Feng et al. The carbon nanotube film is free standing and includes a plurality of carbon nanotubes joined end-to-end by van der Waals attractive force therebetween. The carbon nanotubes in the carbon nanotube film are substantially aligned along the lengthwise direction of the carbon nanotube film, and thus, the carbon nanotube film has good thermal and electrical conductivity along the direction of the aligned carbon nanotubes. The carbon nanotube film is substantially transparent and can be used as a conductive thin film. Therefore, the carbon nanotube film can be used in many different fields, such as touch panels, liquid crystal displays, speakers, heating devices, thin film transistors, cables, and the like.

BRIEF DESCRIPTION OF THE DRAWING

Implementations of the present technology will now be described, by way of example only, with reference to the attached figures, wherein.

DETAILED DESCRIPTION

Figure 1:
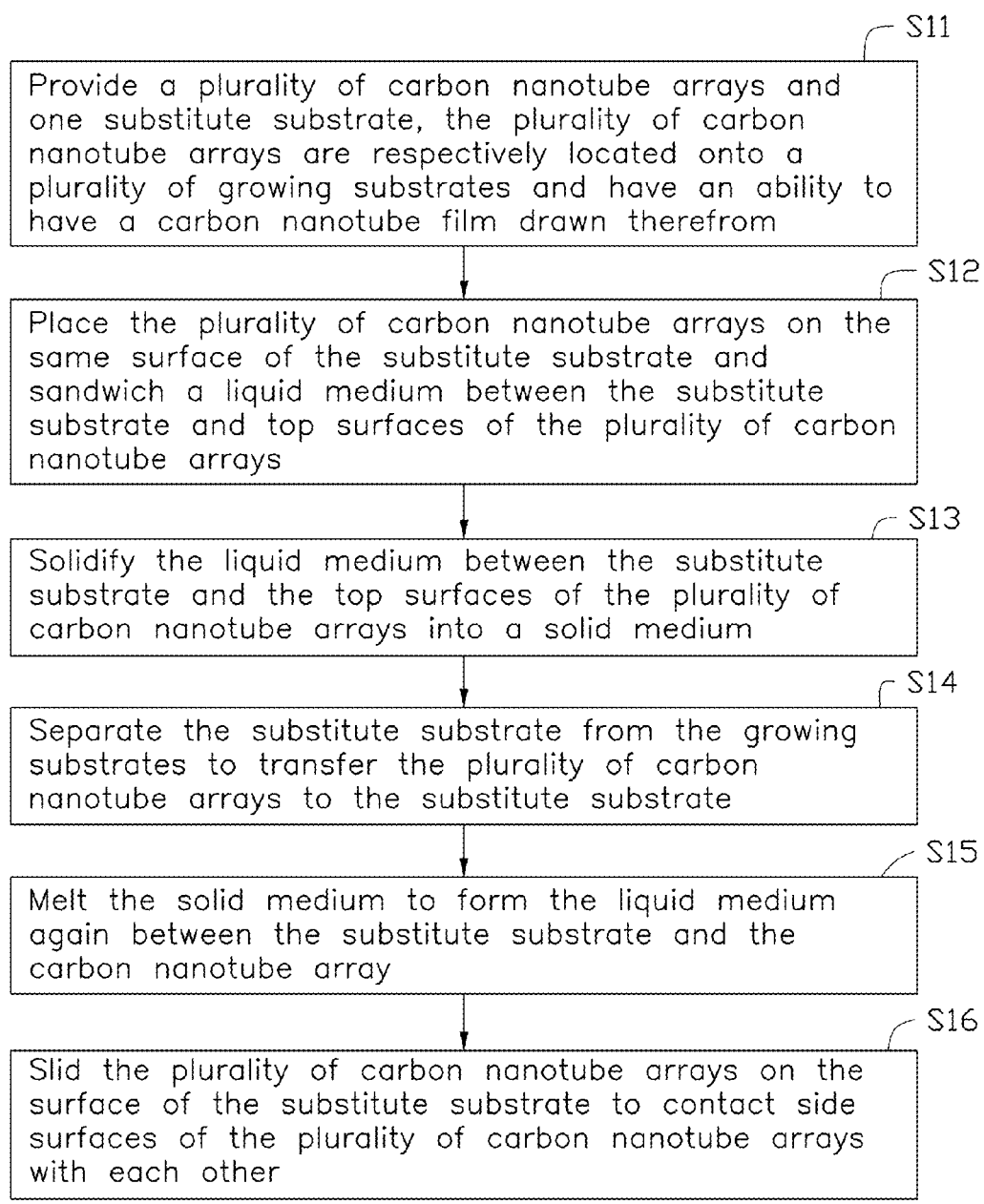
FIG. 1 is a flow chart of an embodiment of a method for a making carbon nanotube array.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "contact" is defined as a direct and physical contact. The term "substantially" is defined to be essentially conforming to the particular dimension, shape, or other description that is described, such that the component need not be exactly conforming to the description. The term "comprising," when utilized, means "including, but not necessarily limited to"; it specifically indicates open-ended inclusion or membership in the so-described combination, group, series, and the like.

Figure 2:
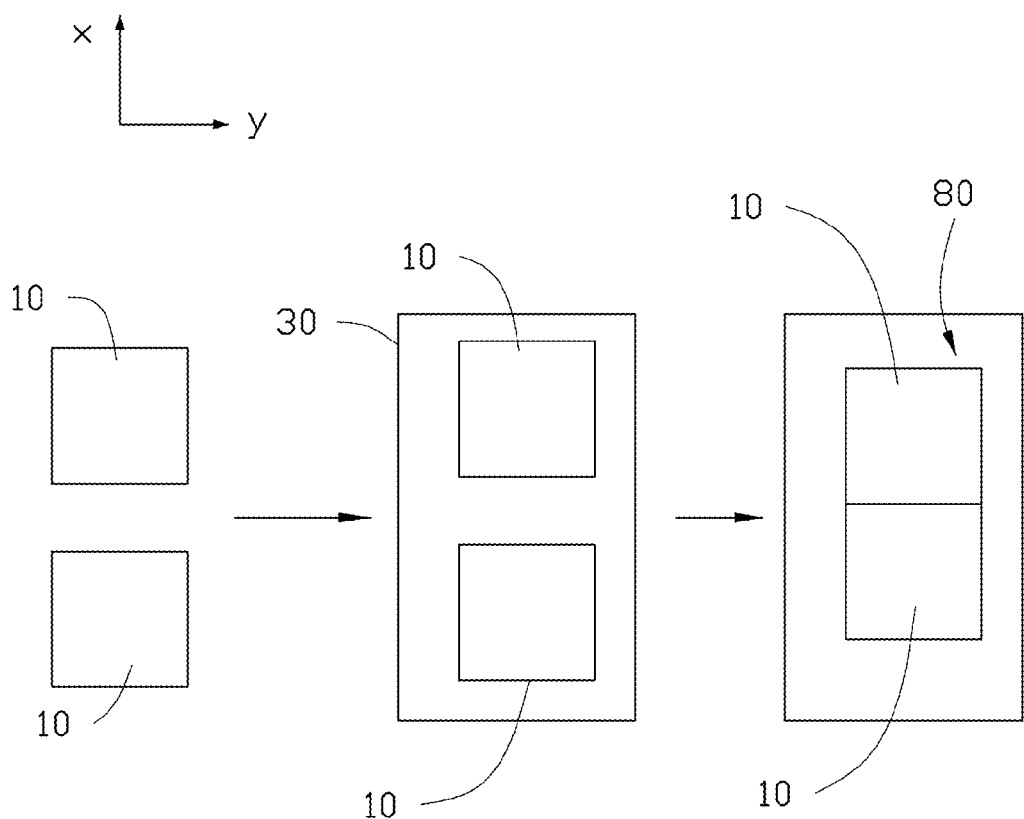
FIG. 2 is a schematic top view of an embodiment of the method for making the carbon nanotube array.
Figure 3:
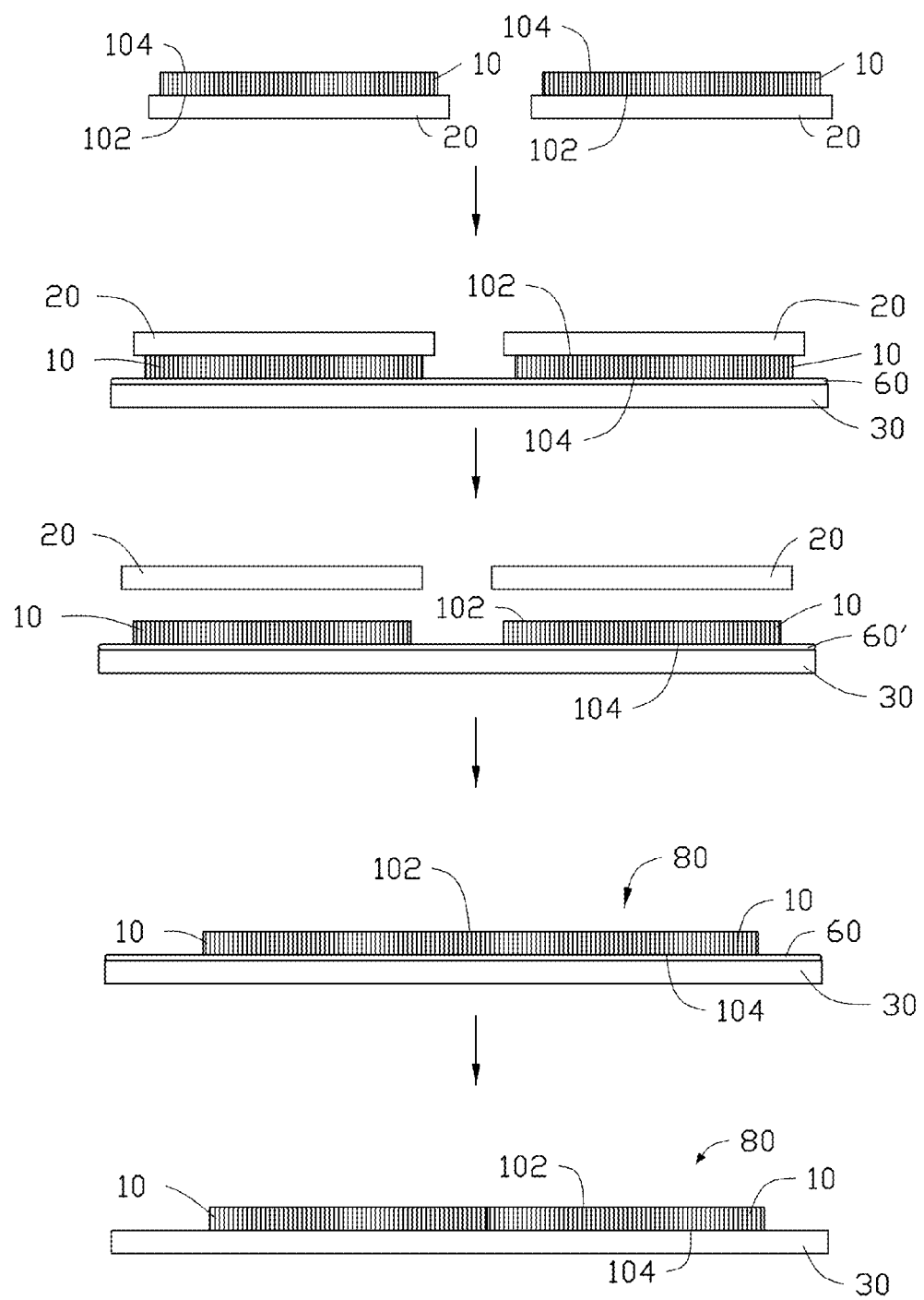
FIG. 3 is a schematic side view of an embodiment of a method for transferring a carbon nanotube array.

Referring to FIG. 1 to FIG. 3, the present disclosure is described in relation to a method for making a carbon nanotube assembling array 80.

In block S1, one substitute substrate 30 and a plurality of carbon nanotube arrays 10 are provided. The plurality of carbon nanotube arrays 10 are respectively located onto a plurality of growing substrates 20. That is, there are a plurality of separated structures, each of which comprises a growing substrate 20 and a carbon nanotube array 10 located onto an individual growing substrate 20. Each carbon nanotube array 10 has a bottom surface 102 and a top surface 104. The bottom surface 102 of the carbon nanotube array 10 is on the growing substrate 20. The top surface 104 of the carbon nanotube array 10 is away from the growing substrate 20. Each carbon nanotube array 10 can be originally grown/formed on the individual growing substrate 20. Each carbon nanotube array 10 has an ability to have a carbon nanotube film 40 drawn therefrom. The carbon nanotube film 40 comprises a plurality of carbon nanotubes joined end to end.

In block S2, the plurality of carbon nanotube arrays 10 are placed on the same surface of the substitute substrate 30. The top surfaces 104 of the plurality of carbon nanotube arrays 10 are adjacent to the surface of the substitute substrate 30. A liquid medium 60 is sandwiched between the substitute substrate 30 and the top surfaces 104 of the plurality of carbon nanotube arrays 10. The surface of the substitute substrate 30 can be substantially smooth and flat.

In block S3, the liquid medium 60 between the substitute substrate 30 and the top surfaces 104 of the plurality of carbon nanotube arrays 10 is solidified into a solid medium 60'.

In block S4, the substitute substrate 30 is separated from the growing substrate 20. Thereby, the bottom surfaces 102 of the plurality of carbon nanotube arrays 10 are separated from the plurality of growing substrates 20, and the plurality of carbon nanotube arrays 10 are transferred to the same substitute substrate 30.

In block S5, the solid medium 60' is melted to form the liquid medium 60 again between the substitute substrate 30 and the carbon nanotube array 10. Due to the liquid medium 60, the plurality of carbon nanotube arrays 10 are capable of sliding on the surface of the substitute substrate 30.

In block S6, the plurality of carbon nanotube arrays 10 are slid on the surface of the substitute substrate 30 to contact side surfaces of the plurality of carbon nanotube arrays 10 with each other. Thereby, the plurality of carbon nanotube arrays 10 have side surfaces contacted and combined with each other by van der Waals attractive force to form the carbon nanotube assembling array 80. The plurality of carbon nanotube arrays 10 are placed side by side. The carbon nanotube assembling array 80 is pieced by the plurality of carbon nanotube arrays 10 and thus has a size larger than each original carbon nanotube array 10. The carbon nanotube assembling array 80 has the ability to have a carbon nanotube film 40 drawn therefrom.

The carbon nanotube film 40 can be a free-standing film comprising a plurality of carbon nanotubes joined end-to-end by van der Waals attractive force therebetween. The carbon nanotube array 10 can be originally grown on the growing substrate 20 to have a state/shape/form that is capable of having a carbon nanotube film 40 drawn therefrom. The carbon nanotube arrays 10 is transferred from different growing substrates 20 to the same substitute substrate 30 and the state/shape/form of the carbon nanotube array 10, before, during, and after the transfer onto the substitute substrate 30, is capable of having the carbon nanotube film 40 drawn therefrom.

The carbon nanotube array 10 can be grown on the growing substrate 20 by a chemical vapor deposition (CVD) method. The carbon nanotube array 10 comprises a plurality of carbon nanotubes oriented substantially perpendicular to a growing surface of the growing substrate 20. The carbon nanotubes in the carbon nanotube array 10 are closely bonded together side-by-side by van der Waals attractive forces. By controlling growing conditions, the carbon nanotube array 10 can be essentially free of impurities such as carbonaceous or residual catalyst particles. Accordingly, the carbon nanotubes in the carbon nanotube array 10 are closely contacting each other, and a relatively large van der Waals attractive force exists between adjacent carbon nanotubes. The van der Waals attractive force is so large that when drawing a carbon nanotube segment (e.g., a few carbon nanotubes arranged side-by-side), adjacent carbon nanotube segments can be drawn out end-to-end from the carbon nanotube array 10 due to the van der Waals attractive forces between the carbon nanotubes. The carbon nanotubes are continuously drawn to form a free-standing and macroscopic carbon nanotube film 40, which can be in the shape of a film or a wire. The carbon nanotube array 10, that can have the carbon nanotube film 40 drawn therefrom, can be a super aligned carbon nanotube array. A material of the growing substrate 20 can be P-type silicon, N-type silicon, or other materials that are suitable for growing the super aligned carbon nanotube array.

The carbon nanotube film 40 drawn from the carbon nanotube array 10 comprises a plurality of carbon nanotubes joined end-to-end and can be a free-standing carbon nanotube film 40. The carbon nanotube film 40 comprises a plurality of carbon nanotubes substantially aligned along the same direction.

Figure 4:
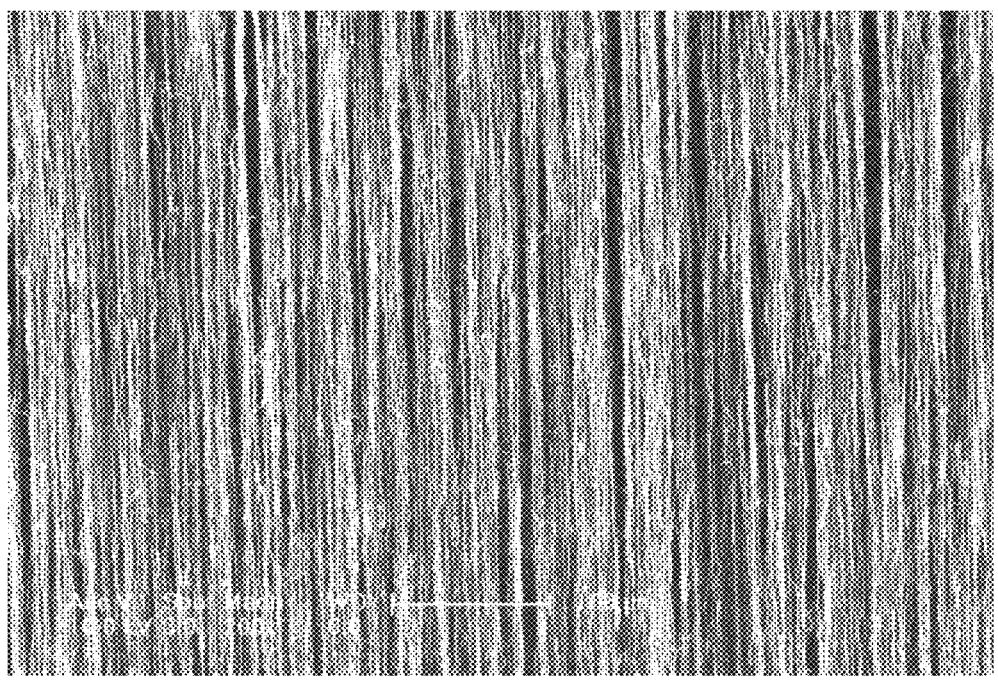
FIG. 4 shows a scanning electron microscope (SEM) image of a carbon nanotube film drawn from the carbon nanotube array.
Figure 5:
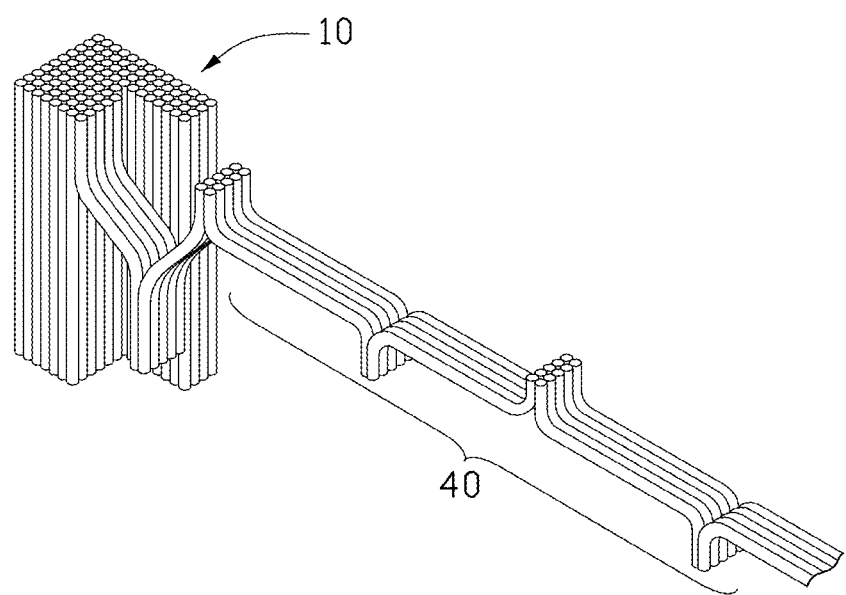
FIG. 5 shows a schematic structure view carbon nanotubes joined end-to-end.

Referring to FIG. 4 and FIG. 5, the carbon nanotube film 40 can comprise or consist of a plurality of carbon nanotubes. In the carbon nanotube film 40, the overall aligned direction of a majority of the carbon nanotubes is substantially aligned along the same direction parallel to a surface of the carbon nanotube film 40. A majority of the carbon nanotubes are substantially aligned along the same direction in the carbon nanotube film 40. Along the aligned direction of the majority of carbon nanotubes, each carbon nanotube is joined to adjacent carbon nanotubes end to end by van der Waals attractive force therebetween, whereby the carbon nanotube film 40 is capable of being free-standing structure. There may be a minority of carbon nanotubes in the carbon nanotube film 40 that are randomly aligned. However, the number of the randomly aligned carbon nanotubes is very small, in comparison, and does not affect the overall oriented alignment of the majority of carbon nanotubes in the carbon nanotube film 40. Some of the majority of the carbon nanotubes in the carbon nanotube film 40 that are substantially aligned along the same direction may not be exactly straight, and can be curved at a certain degree, or not exactly aligned along the overall aligned direction by a certain degree. Therefore, partial contacts can exist between the juxtaposed carbon nanotubes in the majority of the carbon nanotubes aligned along the same direction in the carbon nanotube film. The carbon nanotube film 40 can comprise a plurality of successive and oriented carbon nanotube segments. The plurality of carbon nanotube segments are joined end to end by van der Waals attractive force. Each carbon nanotube segment comprises a plurality of carbon nanotubes substantially parallel to each other, and the plurality of paralleled carbon nanotubes are in contact with each other and combined by van der Waals attractive force therebetween. The carbon nanotube segment has a desired length, thickness, uniformity, and shape. There can be clearances between adjacent and juxtaposed carbon nanotubes in the carbon nanotube film 40. A thickness of the carbon nanotube film at the thickest location is about 0.5 nanometers to about 100 microns (e.g., in a range from 0.5 nanometers to about 10 microns).

The term "free-standing" comprises, but is not limited to, a structure that does not need to be supported by a substrate. For example, a free-standing carbon nanotube film 40 can sustain the weight of itself when it is hoisted by a portion thereof without any significant damage to its structural integrity. If the free-standing carbon nanotube film 40 is placed between two separate supporters, a portion of the free-standing carbon nanotube film 40 suspended between the two supporters can maintain structural integrity. The free-standing carbon nanotube film 40 can be realized by the successive carbon nanotubes joined end to end by van der Waals attractive force.

In the present disclosure, the growing of the carbon nanotube arrays 10 and the drawing of the carbon nanotube film 40 are processed on different structures (i.e., the growing substrates 20 and the substitute substrates 30). The substitute substrates 30 for drawing the carbon nanotube film 40 can be made of low-price materials, and the growing substrates 20 can be recycled quickly. Thus, production of the carbon nanotube film 40 can be optimized.

The material of the substitute substrates 30 can be at least one of soft, elastic, and rigid solid substrate, such as metal, glass, crystal, ceramic, silicon, silicon dioxide, plastic, and resin, such as polymethyl methacrylate and polyethylene terephthalate.

Each substitute substrate 30 has a surface to accept the carbon nanotube array 10 thereon. The surface of the substitute substrate 30 can be flat when the carbon nanotube array 10 is grown on a flat growing surface of the growing substrate 20. During transferring of the carbon nanotube array 10 from the growing substrate 20 to the substitute substrate 30, the state of the carbon nanotube array 10 is still capable of drawing the carbon nanotube film 40 from the carbon nanotube array 10 on the substitute substrate 30. The carbon nanotube array 10 transferred to the substitute substrate 30 is still a super aligned carbon nanotube array. The carbon nanotubes of the carbon nanotube array 10 are substantially perpendicular to the surface of the substitute substrate 30.

The carbon nanotube array 10 is arranged upside down on the surface of the substitute substrate 30. The carbon nanotubes are grown from the growing surface of the growing substrate 20 to form the carbon nanotube array 10. The carbon nanotube comprises a bottom end adjacent or contacting the growing substrate 20 and a top end away from the growing substrate 20. The bottom ends of the carbon nanotubes form the bottom surface 102 of the carbon nanotube array 10, and the top ends of the carbon nanotubes form the top surface 104 of the carbon nanotube array 10. After the carbon nanotube array 10 is transferred to the substitute substrate 30, the top surface 104 of the carbon nanotube array 10 is now adjacent to or contacting the substitute substrate 30, and the bottom surface 102 of the carbon nanotube array 10 is now away from the substitute substrate 30.

In block S2, the plurality of carbon nanotube arrays 10 can be spaced from each other on the substitute substrate 30. The liquid medium 60 can be in a shape of fine droplets, mist, or film. The liquid medium 60 can spread on the entire top surface 104. The liquid medium 60 can comprise or consist of water and/or organic solvents with small molecular weights that are volatile at room temperature or easily evaporated by heating. The organic solvent can be selected from ethanol, methanol, and acetone. The liquid medium 60 has a poor wettability for carbon nanotubes. Thus, when a small amount of the liquid medium 60 is on the top surface 104 of the carbon nanotube array 10, it cannot infiltrate inside the carbon nanotube array 10 and will not affect the state of the carbon nanotube array 10. A diameter of the liquid droplet and a thickness of the liquid film can be in a range from about 10 nanometers to about 300 microns. The substitute substrate 30 and the top surface 104 of the carbon nanotube array 10 are both in contact with the liquid medium 60.

During the placing the plurality of carbon nanotube arrays 10 on the same surface of the substitute substrate 30, the substitute substrate 30 and the growing substrates 20 may apply a pressing force as small as possible to the carbon nanotube array 10. The pressing force can satisfy $0<f<2N/cm^2$. The pressing force does not press the carbon nanotubes down or vary the length direction of the carbon nanotubes in the carbon nanotube array 10. The carbon nanotubes in the carbon nanotube array 10 between the substitute substrate 30 and the growing substrate 20 are always substantially perpendicular to the growing surface of the growing substrate 20. In one embodiment, a spacing element (not shown) is provided. The substitute substrate 30 is spaced from the growing substrate 20 by the spacing element. The spacing element is used to limit the distance between the surface of the substitute substrate and the surface of the growing substrate. The height of the spacing element located between the substitute substrate 30 and the growing substrate 20 is substantially equal to the height of the carbon nanotube array 10.

In one embodiment, the liquid medium 60 is formed on the top surface 104 of the carbon nanotube array 10. The liquid medium 60 can be formed into fine droplets or a mist in the air and drop or collect onto the top surface 104 of the carbon nanotube array 10. The substitute substrate 30 and the carbon nanotube array 10 on the growing substrate 20 are brought together such that the surface of the substitute substrate 30 and the liquid medium 60 on the top surface 104 are contacting each other.

In another embodiment, the liquid medium 60 is formed on the surface of the substitute substrate 30. The liquid medium 60 can be formed into fine droplets or a mist in the air and drop or collect onto the surface of the substitute substrate 30. The substitute substrate 30 and the carbon nanotube array 10 on the growing substrate 20 are brought together such that the top surface 104 of the carbon nanotube array 10 and the liquid medium 60 on the surface of the substitute substrate 30 are contacting each other.

In block S3, during the solidifying of the liquid medium 60, the temperature of the liquid medium 60 can be decreased to below the freezing point of the liquid medium 60. After the liquid medium 60 is solidified, the substitute substrate 30 and the carbon nanotube array 10 can be firmly bonded together by the solid medium 60' therebetween. In one embodiment, water is frozen into ice below 0° C.

Figure 6:
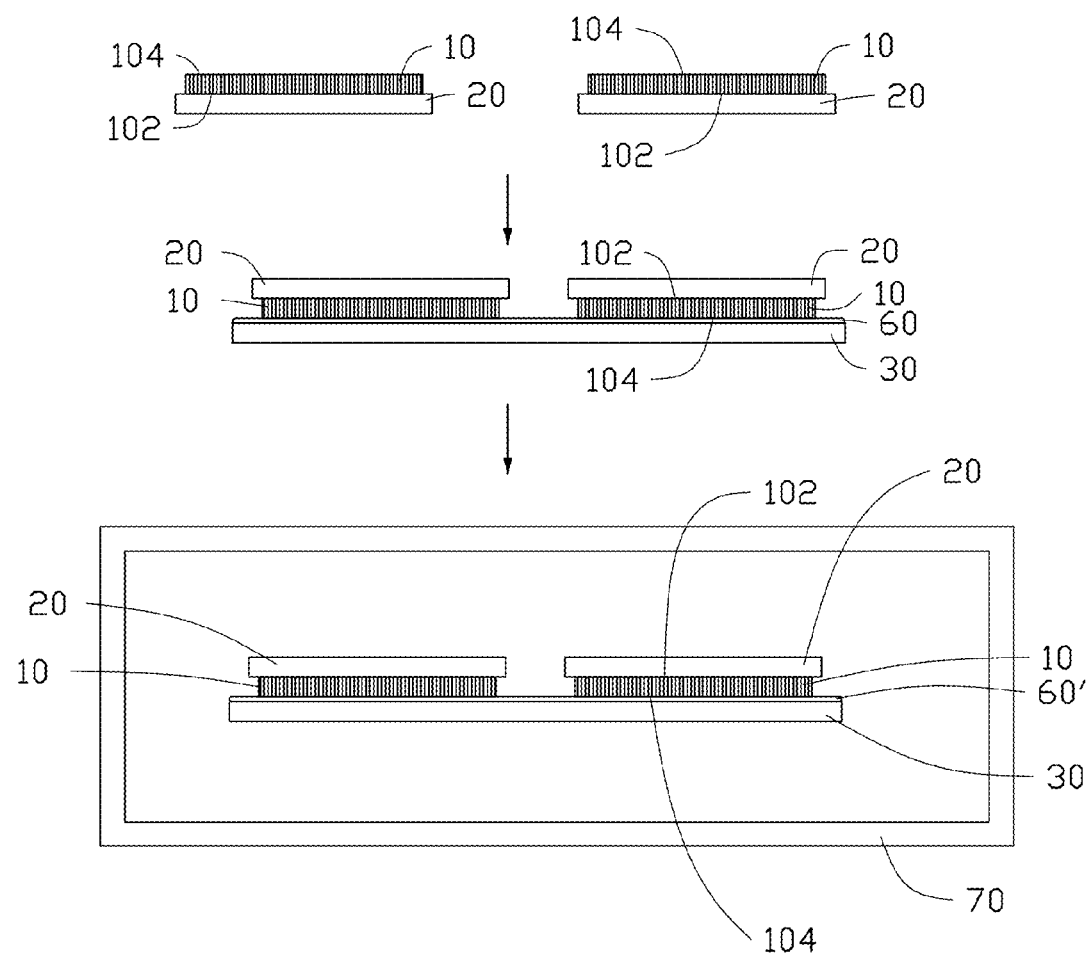
FIG. 6 is a schematic side view of one embodiment of a method for solidifying a liquid medium between a substitute substrate and carbon nanotube arrays into solid medium.

Referring to FIG. 6, in one embodiment, the laminate of the growing substrate 20, the carbon nanotube array 10, the liquid medium 60, and the substitute substrate 30 can be put into a freezer 70 with a temperature below the freezing point to freeze the liquid medium 60.

Figure 7:
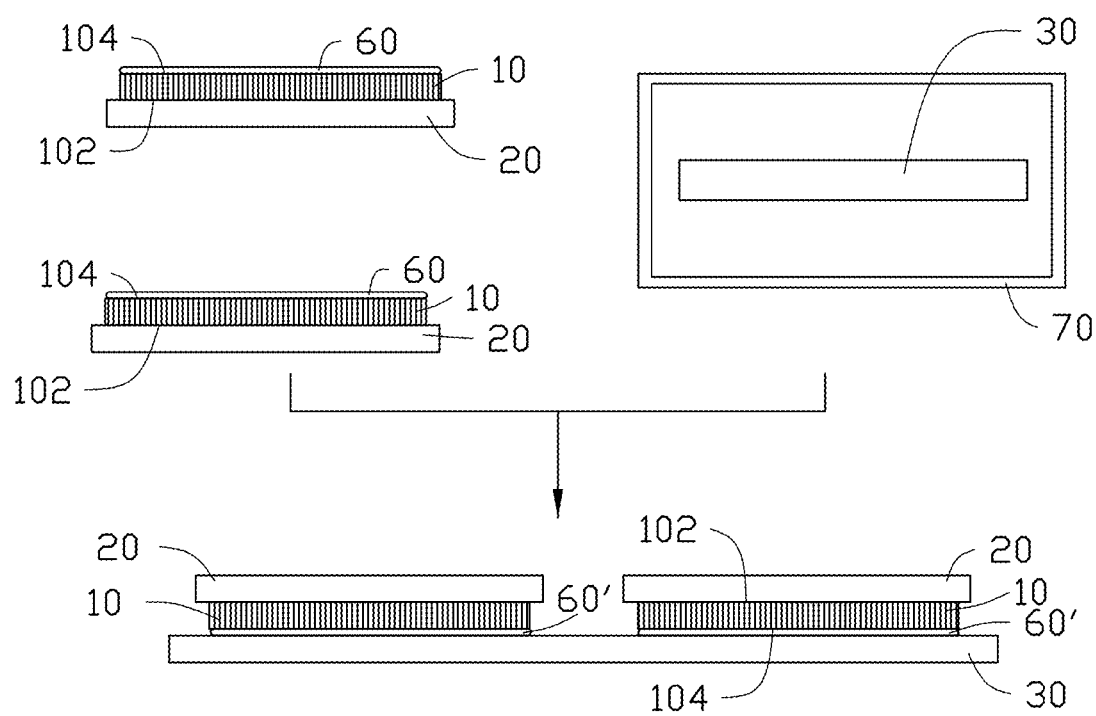
FIG. 7 is a schematic side view of another embodiment of the method for solidifying the liquid medium between the substitute substrate and the carbon nanotube arrays into the solid medium.

Referring to FIG. 7, in another embodiment, when the liquid medium 60 is formed on the top surface 104 of the carbon nanotube array 10, a temperature of the substitute substrate 30 can be decreased to below the freezing point before contacting the substitute substrate 30 with the liquid medium 60. For example, the substitute substrate 30 can be kept in the freezer 70 for a period of time until the substitute substrate 30 reaches a temperature below the freezing point. Thus, when the substitute substrate 30 contacts the liquid medium 60 on the top surface 104 of the carbon nanotube array 10, the liquid medium 60 can be directly frozen into solid medium 60'.

In block S4, during the separating of the substitute substrate 30 from the growing substrate 20, due to the bonding between the carbon nanotube array 10 and the substitute substrate 30 by the solid medium 60', the separating of the two substrates can separate the carbon nanotube array 10 from the growing substrate 20. During the separating, a majority of the carbon nanotubes in the carbon nanotube array 10 can be detached from the growing substrate 20 at the same time by cutting means, or moving either the substitute substrate 30 or the growing substrate 20, or both, away from each other along a direction substantially perpendicular to the growing surface of the growing substrate 20. The carbon nanotubes of the carbon nanotube array 10 are detached from the growing substrate 20 along the growing direction of the carbon nanotubes. When both the substitute substrate 30 and the growing substrate 20 separate, the two substrates both moves along the direction perpendicular to the growing surface of the growing substrate 20 and depart from each other.

In block S5, the solid medium 60' can be heated and melt into liquid medium 60 between the substitute substrate 30 and the carbon nanotube array 10. Thus, the bonding force between the substitute substrate 30 and the carbon nanotube array 10 is decreased, and the carbon nanotube array 10 is moveable on the surface of the substitute substrate 30. The solid medium 60' can assist the sliding of the carbon nanotube arrays 10 on the surface of the substitute substrate 30.

Figure 8:
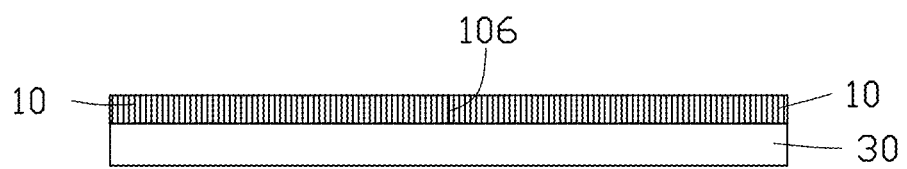
FIG. 8 is a flow chart of an embodiment of a method for a making carbon nanotube film.

Referring to FIG. 8, the carbon nanotube array 10 can have a side surface 106 that is substantially perpendicular to the top surface 104 and the bottom surface 102 and connected between the top surface 104 and the bottom surface 102. In block S6, at least one carbon nanotube array 10 is pushed along a direction perpendicular to the carbon nanotubes in the carbon nanotube array 10 (i.e., perpendicular to the side surface 106 of the carbon nanotube array 10) to slide the carbon nanotube array 10 on the surface of the substitute substrate 30. The plurality of carbon nanotube arrays 10 are brought into contact with each other on the side surfaces 106 thereof. The carbon nanotubes in different carbon nanotube arrays 10 are in contact with each other. Due to that the carbon nanotube array 10 has a relatively large specific surface area, a relatively great van der Waals attractive force can be formed between the adjacent and contacted side surfaces 106 of the carbon nanotube arrays 10. This van der Waals attractive force formed between the adjacent and different carbon nanotube arrays 10 can be comparable with the van der Waals attractive force between carbon nanotubes in the same carbon nanotube array 10. Thus, the carbon nanotube assembling array 80 that is formed by contacting the side surfaces 106 of the carbon nanotube arrays 10 can be seen as an integrated carbon nanotube array 10. The area of the top surface of the assembling array 80 is equal to the sum area of the top surfaces 104 of the carbon nanotube arrays 10.

The assembling array 80 has a size larger than one carbon nanotube array 10 at least along a first direction (x).

During the contacting of the side surfaces 106 of the carbon nanotube arrays 10, the larger the contacting area, the closer the two side surfaces 106, the larger the van der Waals attractive force formed between the side surfaces 106. The carbon nanotube arrays 10 can have a corresponding shape of the side surfaces 106 to have a large contact with each other. For example, the side surfaces 106 of the two carbon nanotube arrays 10 can be both flat. The carbon nanotube arrays 10 can be pushed by a force cannot be too large to ensure the state of the carbon nanotube array 10 is still capable of drawing the carbon nanotube film 40. The pressing force is not to press the carbon nanotubes down on the substitute substrate 30.

In one embodiment, after the assembling array 80 is formed, the liquid medium 60 between the assembling array 80 and the substitute substrate 30 can be removed by heating or naturally drying. The removal of the liquid medium 60 does not affect the state of the carbon nanotube assembling array 80. Due to the thickness of the liquid medium 60 being small, after the removal of the liquid medium 60, the top surface 104 of the assembling array 80 can be in contact with the surface of the substitute substrate 30 and bonded by van der Waals attractive forces.

In another similar embodiment of the method for making the carbon nanotube assembling array 80, the material of the substitute substrate 30 is ice formed by cooling water or organic solvent below the freezing point. In block S3 of this embodiment, the liquid medium 60 is solidified by the ice. The ice substitute substrate 30 has a smooth and flat surface the arrange the carbon nanotube arrays 10.

In yet another similar embodiment of the method for making a carbon nanotube assembling array 80, the liquid medium 60 is a liquid solution of polyvinyl alcohol (PVA). The PVA is dissolved in a solvent to form the liquid solution. The amount of the PVA in the liquid medium 60 can be as small as possible. In one embodiment, the weight percentage of the PVA in the liquid solution and the liquid medium 60 is about 0.1% to about 2%.

Figure 9:
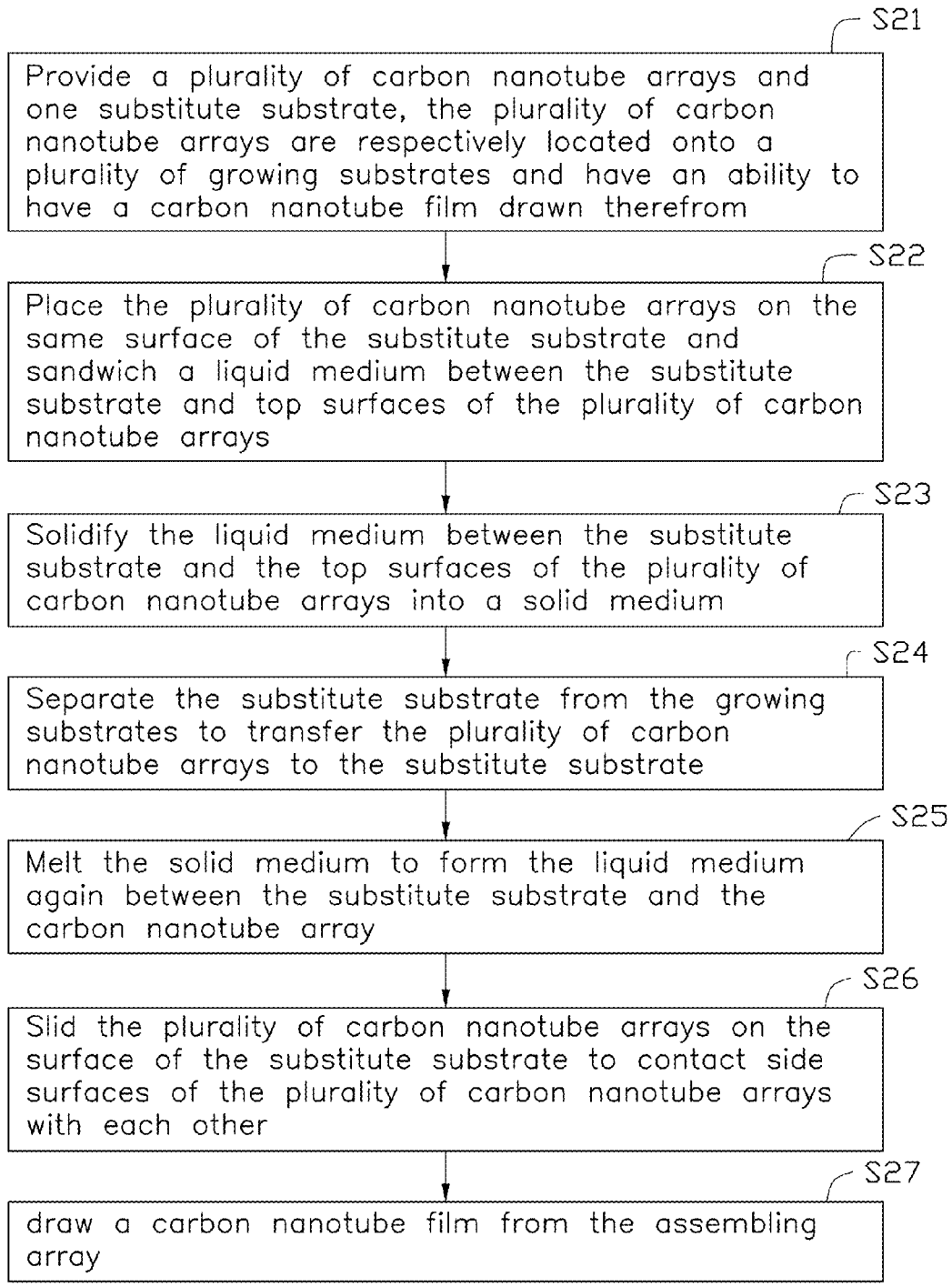
FIG. 9 is a schematic side view of an embodiment of an assembling array.
Figure 10:
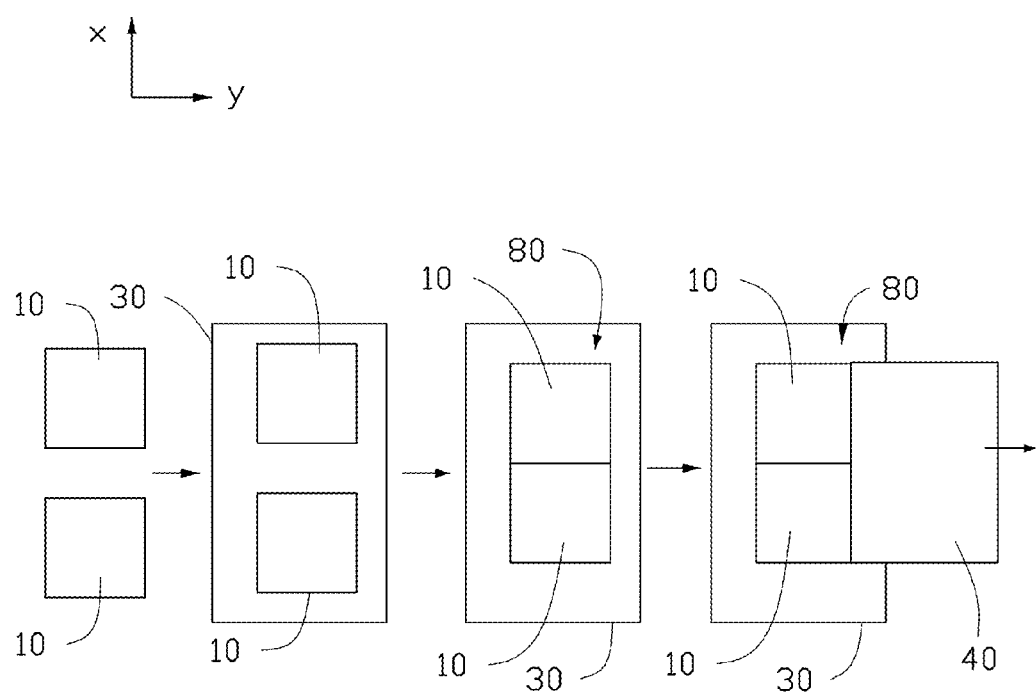
FIG. 10 is a schematic top view of an embodiment of the method for making the carbon nanotube film.
Figure 11:
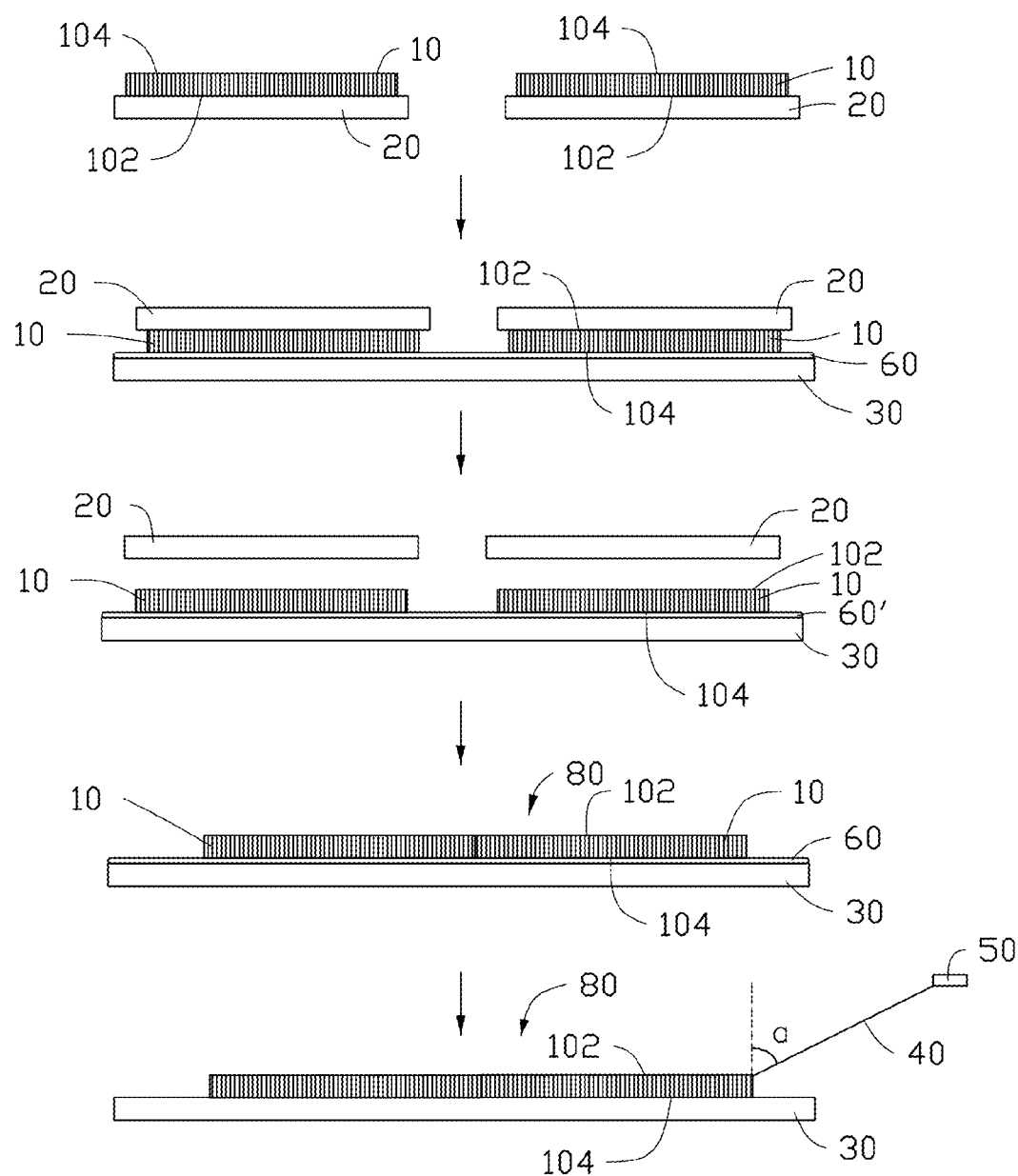
FIG. 11 is a schematic side view of an embodiment of a method for transferring a carbon nanotube film.

Referring to FIG. 9 to FIG. 11, the present disclosure is also described in relation to a method for making a carbon nanotube film 40, which comprising all the steps in blocks S1 to S7, and a step in block S8 wherein the carbon nanotube film 40 is drawn from the carbon nanotube assembling array 80.

In block S8, a carbon nanotube segment having a predetermined width can be selected from the assembling array 80 by using a drawing tool 50. A plurality of carbon nanotube segments joined end to end by van der Waals attractive force can be drawn by moving the drawing tool 50, thereby forming a continuous carbon nanotube film 40.

The drawing tool 50 can be adhesive tape, pliers, tweezers, or other tool allowing multiple carbon nanotubes to be gripped and pulled simultaneously.

The carbon nanotube segment comprises a single carbon nanotube or a plurality of carbon nanotubes substantially parallel to each other. The drawing tool 50 such as adhesive tape can be used for selecting and drawing the carbon nanotube segment. The adhesive tape may contact with the carbon nanotubes in the assembling array 80 to select the carbon nanotube segment. The drawing tool 50 can select a large width of carbon nanotube segments to form the carbon nanotube film 40

An angle between a drawing direction of the carbon nanotube segments and the growing direction of the carbon nanotubes in the assembling array 80 can be larger than 0 degrees (e.g., 30° to 90°).

In block S8, the carbon nanotube film 40 is drawn from the assembling array 80 that was transferred to the substitute substrates 30, not from the carbon nanotube array 10 located on the growing substrate 20. The carbon nanotube film 40 can be drawn from the assembling array 80 pieced by the carbon nanotube arrays 10 upside down on the surfaces of the substitute substrates 30 (i.e., drawn from the bottom surfaces 102 of the carbon nanotube arrays 10).

Block S8 is different from the separating of the carbon nanotube array 10 as a whole from the growing substrate 20. The carbon nanotube array 10 separated from the growing substrate 20 still in the array shape. The purpose of block S8 is to draw out carbon nanotubes one by one or segment by segment to form a carbon nanotube film 40 from the assembling array 80 on the substitute substrates 30.

The carbon nanotube film 40 can be drawn along any direction from the assembling array 80. The assembling array 80 has the size larger than the single carbon nanotube array 10 along the first direction (x). When drawing the carbon nanotube film 40 along a second direction (y) substantially perpendicular to the first direction (x), the drawn carbon nanotube film 40 can have a larger width than the carbon nanotube film that is drawn from the single carbon nanotube array 10. Due to the assembling array 80 that is pieced by the plurality of carbon nanotube arrays 10 is an integrated structure, the drawn carbon nanotube film 40 is also an integrated film which is different from drawing two separate carbon nanotube films simultaneously from two separate carbon nanotube arrays 10.

Depending on the embodiment, certain blocks/steps of the methods described may be removed, others may be added, and the sequence of blocks may be altered. It is also to be understood that the description and the claims drawn to a method may comprise some indication in reference to certain blocks/steps. However, the indication used is only to be viewed for identification purposes and not as a suggestion as to an order for the blocks/steps.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A method for forming a carbon nanotube assembling array, the method comprising:
    providing a plurality of carbon nanotube arrays and a substitute substrate, the plurality of carbon nanotube arrays are individually located on a plurality of growing substrates and have an ability to have a carbon nanotube film drawn therefrom, each of the plurality of carbon nanotube arrays comprises a bottom surface adjacent to a growing substrate and a top surface away from the growing substrate;
    placing the plurality of carbon nanotube arrays on an accepting surface of the substitute substrate and sandwiching a liquid medium between the substitute substrate and the plurality of carbon nanotube arrays;
    solidifying the liquid medium into a solid medium between the substitute substrate and the plurality of carbon nanotube arrays;
    separating the substitute substrate from the plurality of growing substrates, thereby separating the bottom surface of each of the plurality of carbon nanotube arrays from the growing substrate;
    melting the solid medium to form the liquid medium again between the substitute substrate and the plurality of carbon nanotube arrays; and
    sliding the plurality of carbon nanotube arrays on the accepting surface of the substitute substrate such that side surfaces of the plurality of carbon nanotube arrays are in contact with each other.

2. The method of claim 1, wherein the carbon nanotube film comprises a plurality of carbon nanotubes joined end to end.

3. The method of claim 1, wherein the sandwiching the liquid medium between the substitute substrate and the plurality of carbon nanotube arrays comprises:
    forming the liquid medium on the top surface of each of the plurality of carbon nanotube arrays; and
    contacting the accepting surface and the liquid medium with each other.

4. The method of claim 3, wherein the solidifying the liquid medium between the substitute substrate and the plurality of carbon nanotube arrays comprises contacting the substitute substrate having a temperature below a freezing point with the liquid medium.

5. The method of claim 1, wherein the sandwiching the liquid medium between the substitute substrate and the plurality of carbon nanotube arrays comprises:
    forming the liquid medium on the accepting surface; and
    contacting the top surface of each of the plurality of carbon nanotube arrays and the liquid medium with each other.

6. The method of claim 1, wherein the solidifying the liquid medium between the substitute substrate and the plurality of carbon nanotube arrays comprises placing a lamination of the plurality of growing substrates, the plurality of carbon nanotube arrays, the liquid medium, and the substitute substrate to an area; and the area having a temperature below a freezing point of the liquid medium.

7. The method of claim 1, wherein the liquid medium comprises water.

8. The method of claim 1, wherein the liquid medium is in a shape of a plurality of droplets, mist, or film.

9. The method of claim 8, wherein a diameter of each of the plurality of droplets and a thickness of the film is in a range from about 10 nanometers to about 300 microns.

10. The method of claim 1, wherein the plurality of carbon nanotube arrays comprise a plurality of carbon nanotubes, and during the separating the bottom surface of each of the plurality of carbon nanotube arrays from the growing substrate, substantially all carbon nanotubes are simultaneously detached from the growing substrate.

11. The method of claim 1 further comprising removing the liquid medium between the substitute substrate and the plurality of carbon nanotube arrays after the sliding the plurality of carbon nanotube arrays on the accepting surface of the substitute substrate.

12. The method of claim 1, wherein the substitute substrate comprises ice.

13. The method of claim 1, wherein the side surfaces of the plurality of carbon nanotube arrays are combined by van der Waals attractive force.

14. A method for forming a carbon nanotube structure, the method comprising:
    providing a plurality of carbon nanotube arrays and a substitute substrate, the plurality of carbon nanotube arrays are individually located on a plurality of growing substrates and have an ability to have a carbon nanotube film drawn therefrom, each of the plurality of carbon nanotube arrays comprising a bottom surface adjacent to a growing substrate and a top surface away from the growing substrate;
    placing the plurality of carbon nanotube arrays on an accepting surface of the substitute substrate and sandwiching a liquid medium between the substitute substrate and the plurality of carbon nanotube arrays;
    solidifying the liquid medium into a solid medium between the substitute substrate and the plurality of carbon nanotube arrays;
    separating the substitute substrate from the plurality of growing substrates, thereby separating the bottom surface of each of the plurality of carbon nanotube arrays from the growing substrate;
    melting the solid medium to form the liquid medium again between the substitute substrate and the plurality of carbon nanotube arrays;
    sliding the plurality of carbon nanotube arrays on the accepting surface of the substitute substrate such that side surfaces of the plurality of carbon nanotube arrays are in contact with each other; and
    drawing the carbon nanotube film from the carbon nanotube assembling array.

15. The method of claim 14, wherein the carbon nanotube assembling array has a size larger than one of the plurality of carbon nanotube arrays along a first direction; and a plurality of carbon nanotube segments are drawn along a second direction substantially perpendicular to the first direction.

\* \* \* \* \*